US012761312B2

(12) United States Patent
Shibata et al.

(10) Patent No.: US 12,761,312 B2
(45) Date of Patent: Oct. 13, 2026

(54) DECISION DEVICE, DECISION METHOD, MOBILE TERMINAL, CONTROL METHOD, LOCATION NOTIFICATION SYSTEM, AND LOCATION NOTIFICATION METHOD

(71) Applicant: NTT, Inc., Tokyo (JP)

(72) Inventors: Naotaka Shibata, Musashino (JP); Takeshi Imai, Musashino (JP); Ryo Igarashi, Musashino (JP); Kazutaka Hara, Musashino (JP)

(73) Assignee: NTT, Inc., Tokyo (JP)

( * ) Notice: Subject to any disclaimer, the term of this patent is extended or adjusted under 35 U.S.C. 154(b) by 309 days.

(21) Appl. No.: 18/562,439

(22) PCT Filed: May 20, 2021

(86) PCT No.: PCT/JP2021/019107
§ 371 (c)(1),
(2) Date: Nov. 20, 2023

(87) PCT Pub. No.: WO2022/244169
PCT Pub. Date: Nov. 24, 2022

(65) Prior Publication Data
US 2024/0230832 A1 Jul. 11, 2024

(51) Int. Cl.
*G01S 5/16* (2006.01)
*H04W 4/021* (2018.01)
*H04W 64/00* (2009.01)

(52) U.S. Cl.
CPC ............... *G01S 5/16* (2013.01); *H04W 4/021* (2013.01); *H04W 64/003* (2013.01)

(58) Field of Classification Search
CPC ........ G01S 5/16; H04W 4/021; H04W 64/003
See application file for complete search history.

(56) References Cited

U.S. PATENT DOCUMENTS 9,813,676 B2 * 11/2017 Jovicic ...................... G06T 7/00
2015/0003832 A1 * 1/2015 Yamasaki ............ H04B 10/116 398/115

(Continued)

FOREIGN PATENT DOCUMENTS

JP 201633457 3/2016

OTHER PUBLICATIONS

Signify.com [online], "'Indoor positioning system' using visible light communication," Feb. 21, 2017, retrieved on Oct. 2023, retrieved from URL<https://www.signify.com/ja-jp/our-company/news/press-release-archive/2017/20170221-philips-lighting-introduces-advanced-connected-lighting-solutions>, 9 pages (with machine translation).

*Primary Examiner* — Lester G Kincaid
(74) *Attorney, Agent, or Firm* — Fish & Richardson P.C.

(57) ABSTRACT

One aspect of the present invention is a decision device including: a position information acquisition unit that acquires position information indicating a position where the lighting device is installable and an irradiation target region that is irradiated with light in a case where the lighting device is installed at the position; an adjacency information acquisition unit that acquires adjacency information indicating an adjacency relationship of the irradiation target region on the basis of the position information acquired by the position information acquisition unit; and a decision unit that decides the installation position of the lighting device on the basis of the adjacency information acquired by the adjacency information acquisition unit such that non-irradiation target regions are not adjacent to each other, the non-irradiation target regions being not irradiated with light whose output mode changes due to non-installation of the lighting devices.

8 Claims, 11 Drawing Sheets

(56) References Cited

U.S. PATENT DOCUMENTS

| | | | | |
|---|---|---|---|---|
| 2016/0139234 | A1* | 5/2016 | Ganick | G01S 5/0264<br>398/127 |
| 2022/0317312 | A1* | 10/2022 | Sharma | H04W 4/40 |

* cited by examiner

Fig. 3

| ID | AREA NAME | POSITION | RADIUS | CONFORMITY INFORMATION |
|---|---|---|---|---|
| 1 | AREA 1 | (x1, y1) | r1 | SUITABLE |
| 2 | AREA 2 | (x2, y2) | r2 | UNSUITABLE |
| ... | | | | |
| N | AREA N | (xN, yN) | rN | SUITABLE |

Fig. 5

| | | |
|---|---|---|
| 1 | 2 | 3 |
| 4 | 5 | 6 |
| 7 | 8 | 9 |

Fig. 8

| ID | 1 | 2 | 3 | 4 | 5 | 6 | 7 | 8 | 9 |
|---|---|---|---|---|---|---|---|---|---|
| PRESENT/ ABSENT | ABSENT | PRESENT | ABSENT | PRESENT | ABSENT | PRESENT | ABSENT | PRESENT | ABSENT |

Fig. 9

| | | EAST | NORTH | WEST | SOUTH |
|---|---|---|---|---|---|
| ID | 2 | 3 | NULL | 1 | 5 |
| | 4 | 5 | 1 | NULL | 7 |
| | 6 | NULL | 3 | 5 | 9 |
| | 8 | 9 | 5 | 7 | NULL |

DECISION DEVICE, DECISION METHOD, MOBILE TERMINAL, CONTROL METHOD, LOCATION NOTIFICATION SYSTEM, AND LOCATION NOTIFICATION METHOD

CROSS-REFERENCE TO RELATED APPLICATIONS

This application is a National Stage application under 35 U.S.C. § 371 of International Application No. PCT/JP2021/019107, having an International Filing Date of May 20, 2021.

The disclosure of the prior application is considered part of the disclosure of this application, and is incorporated by reference in its entirety into this application.

TECHNICAL FIELD

The present invention relates to techniques of a decision device, a decision method, a mobile terminal, a control method, a position notification system, and a position notification method.

BACKGROUND ART

With the development of an outdoor position estimation technology using a global positioning system (GPS), we can know our outdoor positions. Further, in order to grasp an indoor position, there is a demand for a system that makes notification of the position. Techniques used in the system that makes notification of a position are, for example, a technique using geomagnetism, a technique using Wi-Fi (registered trademark), and a technique using visible light (see, for example, Non Patent Literature 1).

In the technique using visible light, a dedicated lighting device is used as a lighting device placed on a ceiling. The dedicated lighting device is an LED light including, for example, a driver circuit for modulating IDs and thus is more expensive than a normal LED light. The dedicated lighting device can transmit identification information such as ID information by changing light or color. A mobile terminal can acquire the identification information from intensity information of the received light. A position of the dedicated lighting device is associated with the identification information, and thus it is possible to estimate a position of the mobile terminal.

CITATION LIST

Non Patent Literature

Non Patent Literature 1: "Indoor positioning system" using visible optical communication, the Internet (URL:https://www.signify.com/ja-jp/our-company/news/press-release-archive/2017/20170221-philips-lighting-introduces-advanced-connected-lighting-solutions)

SUMMARY OF INVENTION

Technical Problem

In the technique using visible light, it is necessary to use the dedicated lighting devices in an entire indoor space. This increases a cost required for the lighting devices. Therefore, in the related arts, it is difficult to economically build a system that makes notification of a position.

In view of the above circumstances, an object of the present invention is to provide a technique capable of economically building a system that makes notification of a position.

Solution to Problem

One aspect of the present invention is a decision device that decides an installation position of a lighting device having a transmission function of transmitting information by changing an output mode of light, the decision device including: a position information acquisition unit that acquires position information indicating a position where the lighting device is installable and an irradiation target region that is irradiated with light in a case where the lighting device is installed at the position; an adjacency information acquisition unit that acquires adjacency information indicating an adjacency relationship of the irradiation target region on the basis of the position information acquired by the position information acquisition unit; and a decision unit that decides the installation position of the lighting device on the basis of the adjacency information acquired by the adjacency information acquisition unit such that non-irradiation target regions are not adjacent to each other, the non-irradiation target regions being not irradiated with light whose output mode changes due to non-installation of the lighting devices.

One aspect of the present invention is a decision method of deciding an installation position of a lighting device having a transmission function of transmitting information by changing an output mode of light, the decision method including: a position information acquisition step of acquiring position information indicating a position where the lighting device is installable and an irradiation target region that is irradiated with light in a case where the lighting device is installed at the position; an adjacency information acquisition step of acquiring adjacency information indicating an adjacency relationship of the irradiation target region on the basis of the position information acquired in the position information acquisition step; and a decision step of deciding the installation position of the lighting device on the basis of the adjacency information acquired in the adjacency information acquisition step such that non-irradiation target regions are not adjacent to each other, the non-irradiation target regions being not irradiated with light whose output mode changes due to non-installation of the lighting devices.

One aspect of the present invention is a mobile terminal including: a detection unit that detects a moving direction of the mobile terminal; a determination unit that determines whether or not position specification information transmitted from a lighting device by changing an output mode of light is acquirable; and a moving direction acquisition unit that acquires the moving direction detected by the detection unit in a case where the determination unit determines that the position specification information is not acquirable; and a position derivation unit that derives a position of the mobile terminal on the basis of the position specification information acquired before the determination unit determines that the position specification information is not acquirable and the moving direction acquired by the moving direction acquisition unit.

One aspect of the present invention is a control method of a mobile terminal, the control method including: a detection step of detecting a moving direction of the mobile terminal; a determination step of determining whether or not position specification information transmitted from a lighting device by changing an output mode of light is acquirable; a moving direction acquisition step of acquiring the moving direction detected in the detection step in a case where it is determined in the determination step that the position specification information is not acquirable; and a position derivation step of deriving a position of the mobile terminal on the basis of the position specification information acquired before it is determined in the determination step that the position specification information is not acquirable and the moving direction acquired in the moving direction acquisition step.

One aspect of the present invention is a position notification system including a mobile terminal and a server, in which: the mobile terminal includes a detection unit that detects a moving direction of the mobile terminal, a determination unit that determines whether or not position specification information transmitted from a lighting device by changing an output mode of light is acquirable, and a moving direction acquisition unit that acquires the moving direction detected by the detection unit in a case where the determination unit determines that the position specification information is not acquirable; and the server includes a position derivation unit that derives a position of the mobile terminal on the basis of the position specification information acquired before the determination unit determines that the position specification information is not acquirable and the moving direction acquired by the moving direction acquisition unit.

One aspect of the present invention is a position notification method in a position notification system including a mobile terminal and a server, the position notification method including: a detection step of causing the mobile terminal to detect a moving direction of the mobile terminal; a determination step of causing the mobile terminal to determine whether or not position specification information transmitted from a lighting device by changing an output mode of light is acquirable; and a moving direction acquisition step of causing the mobile terminal to acquire the moving direction detected in the detection step in a case where it is determined in the determination step that the position specification information is not acquirable; and a position derivation step of causing the server to derive a position of the mobile terminal on the basis of the position specification information acquired before it is determined in the determination step that the position specification information is not acquirable and the moving direction acquired in the moving direction acquisition step.

Advantageous Effects of Invention

According to the present invention, it is possible to economically build a system that makes notification of a position.

BRIEF DESCRIPTION OF DRAWINGS

FIG. 3 illustrates a specific example of an area ID database.

FIG. 5 illustrates an example of irradiation target regions.

FIG. 8 illustrates a specific example of an area ID database.

FIG. 9 illustrates a specific example of a direction database.

DESCRIPTION OF EMBODIMENTS

An embodiment of the present invention will be described in detail with reference to the drawings. In the present embodiment, there will be described a decision phase for deciding an installation position of a lighting device and a derivation phase for a mobile terminal deriving a position by using the installed lighting device.

<Decision Phase>

Figure 1:
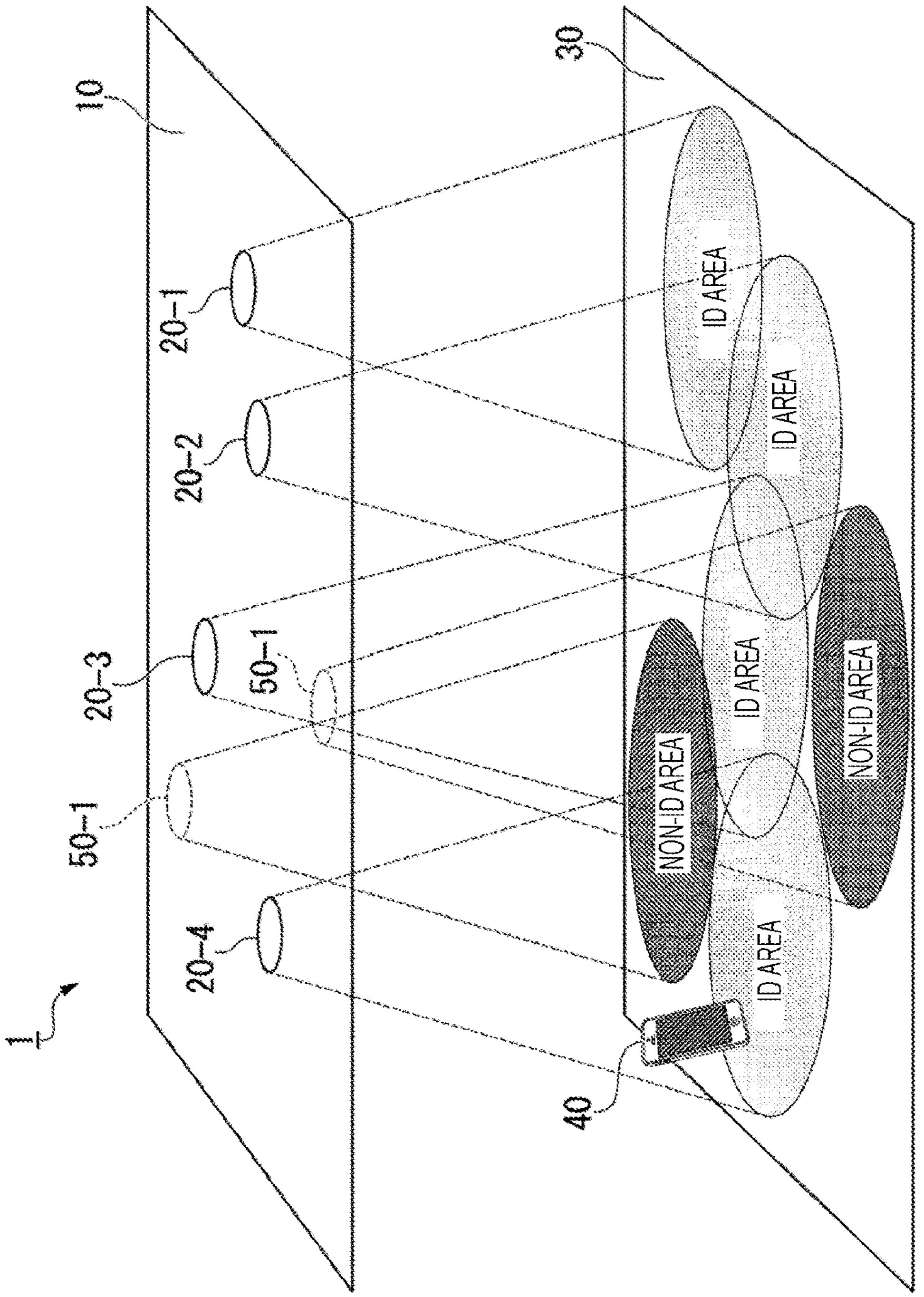
FIG. 1 illustrates a configuration example of a position notification system.

FIG. 1 illustrates a configuration example of a system that makes notification of a position (hereinafter, referred to as "position notification system"). A position notification system 1 includes a plurality of lighting devices 20-1, 20-2, 20-3, and 20-4 on a ceiling 10. In the following description, the lighting devices 20-1, 20-2, 20-3, and 20-4 will be referred to as lighting devices 20 when the lighting devices are not distinguished from one another.

Each lighting device 20 is an LED light and irradiates a floor surface 30 with light. The lighting device 20 can transmit a signal to a mobile terminal 40 by changing an output mode (blinking pattern in the present embodiment) of light corresponding to identification information (hereinafter, referred to as "ID"). The ID is uniquely allocated to an irradiation target region, and the lighting device 20 transmits a signal to the mobile terminal 40 by using a blinking pattern indicating the ID. Therefore, when the ID is acquired, the irradiation target region is specified on the basis of the ID, and thus it is found that the mobile terminal 40 is located at any position in the irradiation target region.

When the lighting device 20 is installed, the mobile terminal 40 can acquire an ID in an irradiation target region irradiated with light of the lighting device 20. Meanwhile, the mobile terminal 40 cannot acquire an ID in an irradiation target region that is not irradiated with light because no lighting device 20 is installed. As illustrated in FIG. 1, an irradiation target region irradiated with light of the lighting device 20 will be referred to as an ID area. An irradiation target region that is not irradiated with light having ID information because no lighting device 20 is installed will be referred to as a non-ID area. The non-ID area merely indicates that the area is not irradiated with light having ID information, and an ID is allocated to the irradiation target region.

In FIG. 1, no lighting device 20 is installed at installation positions 50-1 and 50-2. Thus, FIG. 1 illustrates two non-ID areas. In the present embodiment, as illustrated in FIG. 1, installation positions of the lighting devices 20 are decided such that the non-ID areas are not adjacent to each other. A decision device that decides the installation positions will be described.

Figure 2:
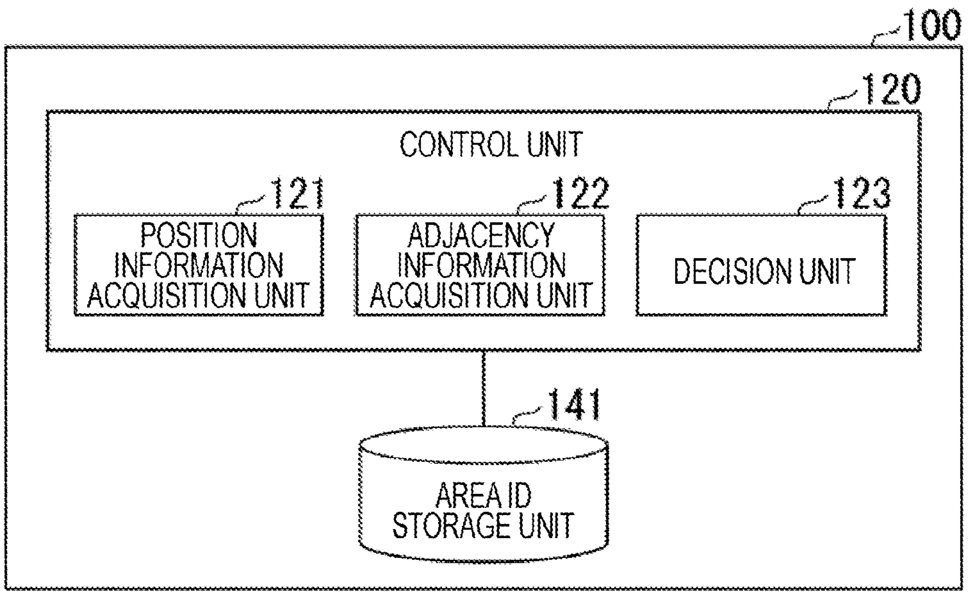
FIG. 2 is a functional block diagram illustrating a functional configuration of a decision device 100.

FIG. 2 is a functional block diagram illustrating a functional configuration of the decision device 100. The decision device 100 includes a central processing unit (CPU), a memory, an auxiliary storage device, and the like connected via a bus and functions as a device including a control unit 120 and an area ID storage unit 141 by executing a control program.

All or some functions of the control unit 120 and the area ID storage unit 141 may be implemented by using hardware such as an application specific integrated circuit (ASIC), a programmable logic device (PLD), or a field programmable gate array (FPGA). The control program may be recorded on a computer-readable recording medium. Examples of the computer-readable recording medium include portable media such as a flexible disk, a magneto-optical disk, a ROM, a CD-ROM, and a semiconductor storage device (e.g. a solid-state drive (SSD)) and storage devices such as a hard disk built in a computer system. The control program may be transmitted via an electrical communication line.

The area ID storage unit 141 includes a storage device such as a semiconductor storage device or a magnetic hard disk device. The area ID storage unit 141 stores an area ID database. FIG. 3 illustrates a specific example of the area ID database in a case where a maximum of N lighting devices 20 can be installed. The area ID database includes an ID, an area name, a position, a radius, and conformity information. As described above, the ID is uniquely allocated to each irradiation target region. The area name is a name of the irradiation target region. In FIG. 3, the area name is given such that an ID is added after “area”.

The position indicates coordinates of an installation position when the ceiling 10 is regarded as the XY plane. The floor surface 30 is also regarded as the XY plane, and coordinates at which a perpendicular line from the coordinates of the installation position to the floor surface 30 intersects the floor surface 30 have the same XY components as the coordinates on the ceiling 10. The radius is a radius of a circle centered on the coordinates, and the circle indicates the irradiation target region. The position and the radius in the area ID storage unit 141 are examples of position information.

The conformity information indicates whether or not the installation position is suitable for installation of the lighting device. “Suitable” indicates that the installation position is suitable for the installation thereof, and “unsuitable” indicates that the installation position is not suitable for the installation thereof. The fact that the installation position is not suitable for the installation of the lighting device indicates that the lighting device 20 is installable, but the installation position is not very preferable in terms of operation, such as an irradiation target region in which an appliance or the like is installed or an irradiation target region in which it is difficult to confirm whether or not the mobile terminal 40 can acquire a position because the irradiation target region is far from the entrance. A degree of conformity may be indicated in stages. For example, the degree of conformity may be set as five stages. The installation position is less suitable as the stage is higher, and the lighting device may not be installed as the installation position is less suitable.

Returning to the description of FIG. 2, the control unit 120 in FIG. 2 controls operation of each unit of the decision device 100. The control unit 120 is executed by, for example, a device including a processor such as a CPU and a RAM. The control unit 120 functions as a position information acquisition unit 121, an adjacency information acquisition unit 122, and a decision unit 123 by executing the control program.

The position information acquisition unit 121 acquires, from the area ID storage unit 141, position information indicating a position where the lighting device 20 is installable and an irradiation target region that is irradiated with light in a case where the lighting device 20 is installed at the position. Based on the position information, the adjacency information acquisition unit 122 acquires adjacency information indicating an adjacency relationship of the irradiation target region. Based on the adjacency information, the decision unit 123 decides an installation position of the lighting device 20 such that irradiation target regions that are not irradiated with light because no lighting devices 20 are installed are not adjacent to each other.

There will be described an example where the above adjacency information acquisition unit 122 determines whether or not two irradiation target regions A and B are adjacent to each other. The adjacency information acquisition unit 122 first acquires a distance between a position of A and a position of B on the basis of FIG. 3. The adjacency information acquisition unit 122 determines that the irradiation target regions A and B are adjacent to each other in a case where the distance is equal to or less than the sum of a radius of A and a radius of B and determines that the irradiation target regions A and B are not adjacent to each other in a case where the distance is larger than the sum of the radius of A and the radius of B.

The adjacency information acquisition unit 122 acquires the adjacency information as, for example, a two-dimensional array N[i][j]. Here, i and j ($i<j$) represent IDs. In a case where irradiation target regions having the IDs i and j are adjacent to each other, N[i][j]=1 is set, whereas, in a case where the irradiation target regions are not adjacent to each other, N[i][j]=0 is set.

Figure 4:
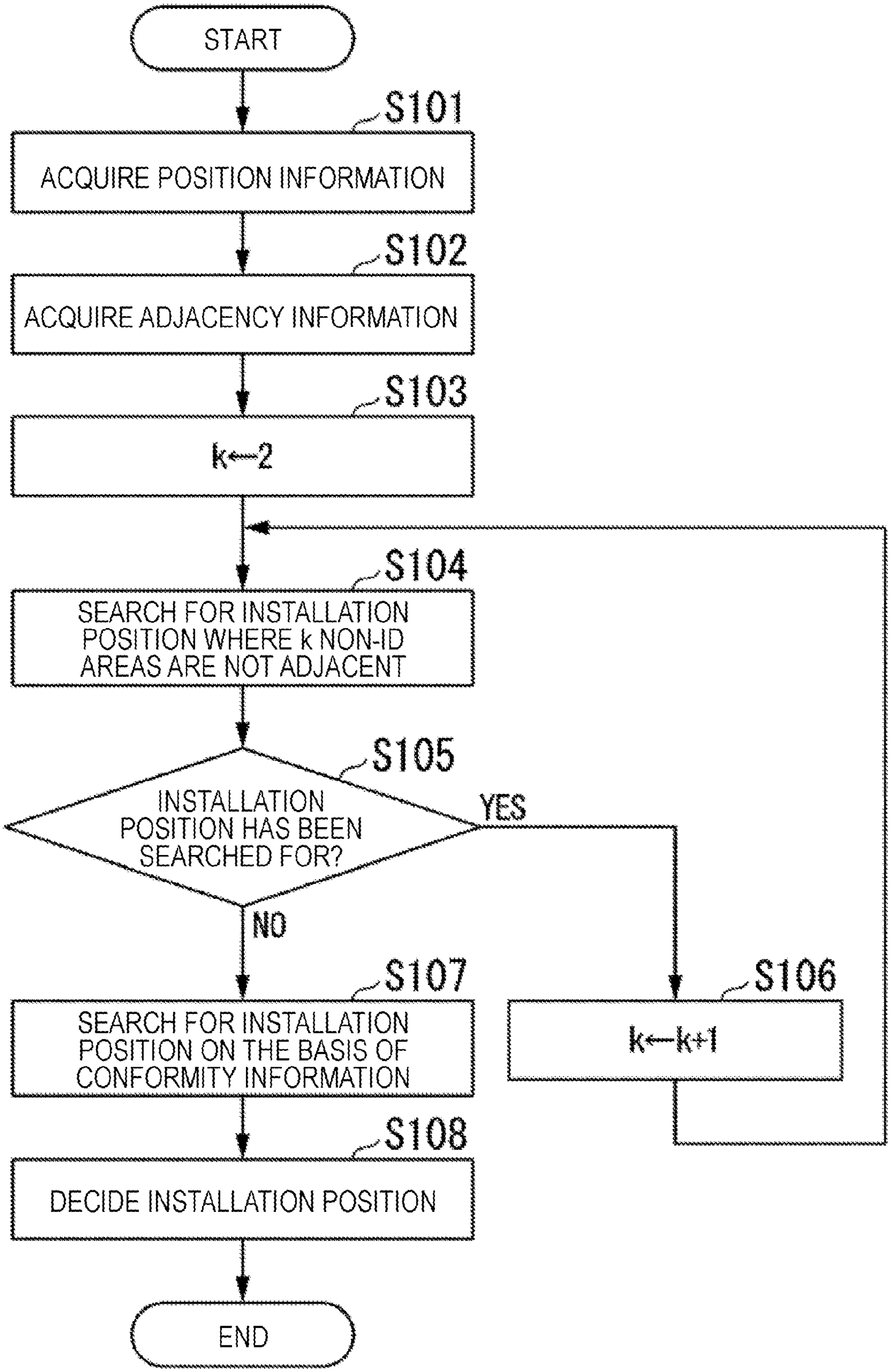
FIG. 4 is a flowchart showing a flow of processing of the decision device 100.

FIG. 4 is a flowchart showing a flow of processing of the decision device 100. The position information acquisition unit 121 acquires position information (step S101). The adjacency information acquisition unit 122 acquires adjacency information. The decision unit 123 initializes k to 2 (step S103). This k indicates the number of non-ID areas. In a case of k=1, it is possible to reliably install a non-ID area. Thus, the decision unit 123 first starts searching whether or not installation positions can be decided such that non-ID areas are not adjacent to each other in a case of a minimum of two non-ID areas.

The decision unit 123 searches for an installation position where k non-ID areas are not adjacent to each other (step S104). The decision unit 123 determines whether or not the installation position has been searched for (step S105). Here, in a case where at least one installation position has been searched for, it is determined that the installation position has been searched for. In a case where the installation position has been searched for (step S105: YES), the decision unit 123 increments k by 1 (step S106) and performs the search again in step S104. That is, the decision unit 123 adds a non-ID area and searches for an installation position where the non-ID areas are not adjacent to each other.

In a case where the installation position has not been searched for (step S105: NO), the decision unit 123 searches for an installation position on the basis of conformity information among installation positions where k−1 non-ID areas are not adjacent to each other (step S107). That is, the decision unit 123 searches for an installation position where the number at which irradiation target regions having “unsuitable” conformity information become non-ID areas is largest.

The decision unit 123 decides the installation position where the number at which irradiation target regions having “unsuitable” conformity information become non-ID areas is largest as the installation position of the lighting device 20 (step S108) and ends the processing.

Because the installation position where the number at which irradiation target regions become non-ID areas is largest is decided as described above, it is possible to reduce the number of lighting devices 20. This makes it possible to economically build a system that makes notification of a position. Further, based on the conformity information, it is possible to reduce, for example, the irradiation target region where an appliance or the like is present and the irradiation target region where it is difficult to confirm whether or not the mobile terminal 40 can acquire a position. This makes it possible to reduce a cost required for installation and to perform suitable operation.

<Derivation Phase>

Next, there will be described the derivation phase in which the mobile terminal 40 derives its own position by using the lighting device 20 installed at the installation position decided in the decision phase. The mobile terminal 40 is assumed to be a smartphone.

FIG. 5 illustrates an example of irradiation target regions. For easy understanding of the description, nine square irradiation target regions are used in the description of the derivation phase. The number given to each square indicates an ID of the irradiation target region.

Figure 6:
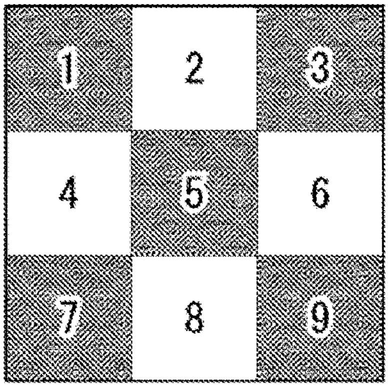
FIG. 6 illustrates ID areas and non-ID areas.

FIG. 6 illustrates ID areas and non-ID areas. Areas 2, 4, 6, and 8 are ID areas, and areas 1, 3, 5, 7, and 9 are non-ID areas. As illustrated in FIG. 6, the non-ID areas are not adjacent to each other. Based on the above description, the derivation phase will be described below.

Figure 7:
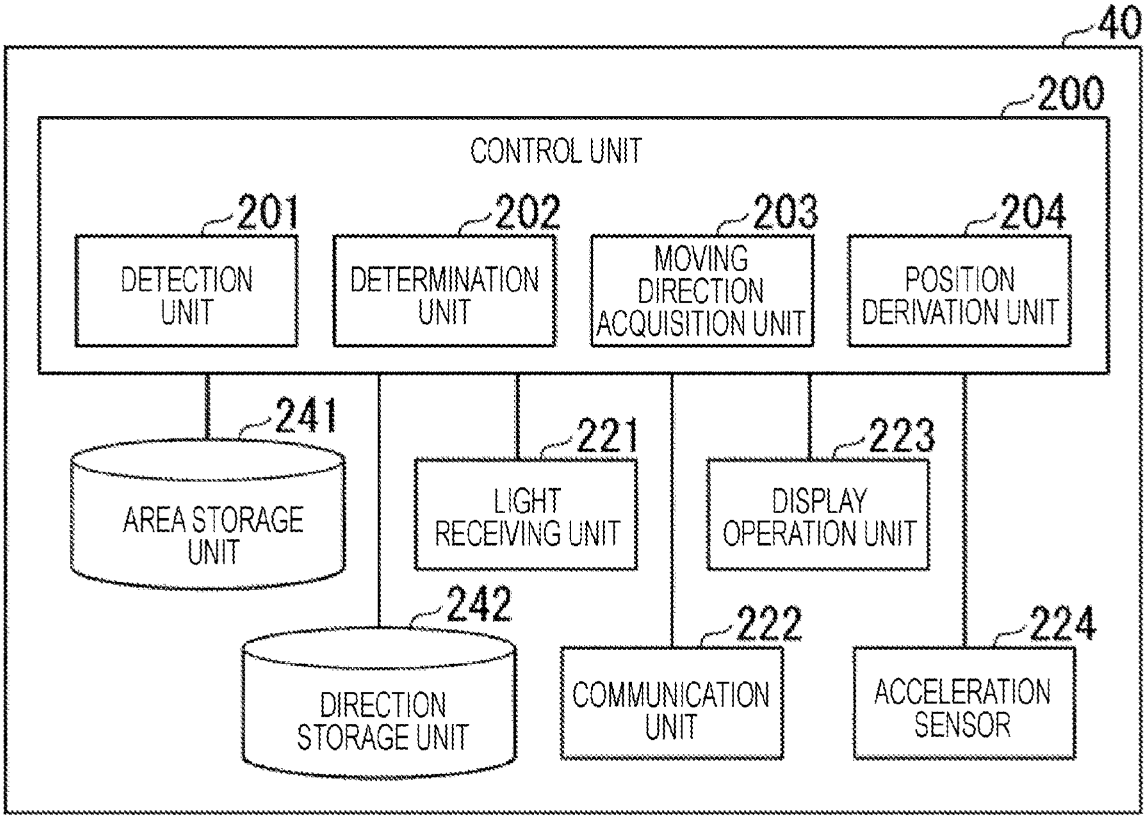
FIG. 7 is a functional block diagram illustrating a functional configuration of a mobile terminal 40.

FIG. 7 is a functional block diagram illustrating a functional configuration of the mobile terminal 40. The mobile terminal 40 includes a CPU, a memory, an auxiliary storage device, and the like connected via a bus and functions as a device including a control unit 200, an area storage unit 241, a direction storage unit 242, a light receiving unit 221, a communication unit 222, a display operation unit 223, and an acceleration sensor 224 by executing a derivation program.

All or some of functions of the control unit 200, the area storage unit 241, and the direction storage unit 242 may be implemented by using hardware such as an ASIC, a PLD, or an FPGA. The derivation program may be recorded on a computer-readable recording medium. Examples of the computer-readable recording medium include portable media such as a flexible disk, a magneto-optical disk, a ROM, a CD-ROM, and a semiconductor storage device (e.g. SSD) and storage devices such as a hard disk built in a computer system. The derivation program may be transmitted via an electrical communication line.

The area storage unit 241 includes a storage device such as a semiconductor storage device or a magnetic hard disk device. The area storage unit 241 stores an area database. FIG. 8 illustrates a specific example of the area ID database. The area database indicates whether the irradiation target region is an ID area or a non-ID area. The area database includes an ID and present or absent. Regarding the presence or absence, a case where the irradiation target region is an ID area indicates "present", whereas a case where the irradiation target region is a non-ID area indicates "absent". As illustrated in FIG. 6, the areas 2, 4, 6, and 8 are ID areas, and the areas 1, 3, 5, and 7 are non-ID areas.

The direction storage unit 242 includes a storage device such as a semiconductor storage device or a magnetic hard disk device. The direction storage unit 242 stores a direction database. FIG. 9 illustrates a specific example of the direction database. The direction database includes an ID area and north, south, east, and west directions.

The direction database indicates which area exists in the north, south, east, and west directions of the ID area. Here, NULL indicates that there is no area. In FIG. 6, the upward direction is north, the rightward direction is east, the leftward direction is west, and the downward direction is south as in a map. For example, an area 3 exists in the east direction of an area 2, no area exists in the north direction thereof, an area 1 exists in the west direction thereof, and an area 5 exists in the south direction thereof. Therefore, the area 2 has 3 in the east, NULL in the north, 1 in the west, and 5 in the south.

Returning to FIG. 7, the light receiving unit 221 receives light emitted from the lighting device 20. The light receiving unit 221 includes, for example, a CCD sensor, an illuminance sensor, and a photodiode (PD). The communication unit 222 performs various kinds of communication by using a communication line such as 4G or 5G, a wireless LAN, Bluetooth (registered trademark), or the like. The display operation unit 223 includes a liquid crystal, an organic EL, a touchscreen, a hard key, and the like. The acceleration sensor 224 detects acceleration and a moving direction when the mobile terminal 40 moves.

The control unit 200 in FIG. 7 controls operation of each unit of the mobile terminal 40. The control unit 200 is executed by, for example, a device including a processor such as a CPU and a RAM. The control unit 200 functions as a detection unit 201, a determination unit 202, a moving direction acquisition unit 203, and a position derivation unit 204 by executing the derivation program.

The detection unit 201 detects the moving direction of the mobile terminal 40 detected by the acceleration sensor 224. The determination unit 202 determines whether or not position specification information transmitted from the lighting device 20 by using light is acquirable. The ID is an example of the position specification information.

In a case where the determination unit 202 determines that the position specification information is not acquirable, the moving direction acquisition unit 203 acquires the moving direction detected by the detection unit 201. Here, the moving direction before it is determined that the position specification information is not acquirable is acquired. For example, the detection unit 201 detects the moving direction each time a predetermined time arrives and stores a time at which the detection has been performed and the moving direction at that time. Therefore, the moving direction acquisition unit 203 can acquire an immediately previous moving direction.

The position derivation unit 204 derives a position of the mobile terminal 40 on the basis of the position specification information acquired before the determination unit 202 determines that the position specification information is not acquirable and the moving direction acquired by the moving direction acquisition unit. For example, in a case where the position specification information acquired before it is determined that the position specification information is not acquirable is 4 and the acquired moving direction is north, the position derivation unit 204 derives the area 1 as a current position by using the direction database.

Figure 10:
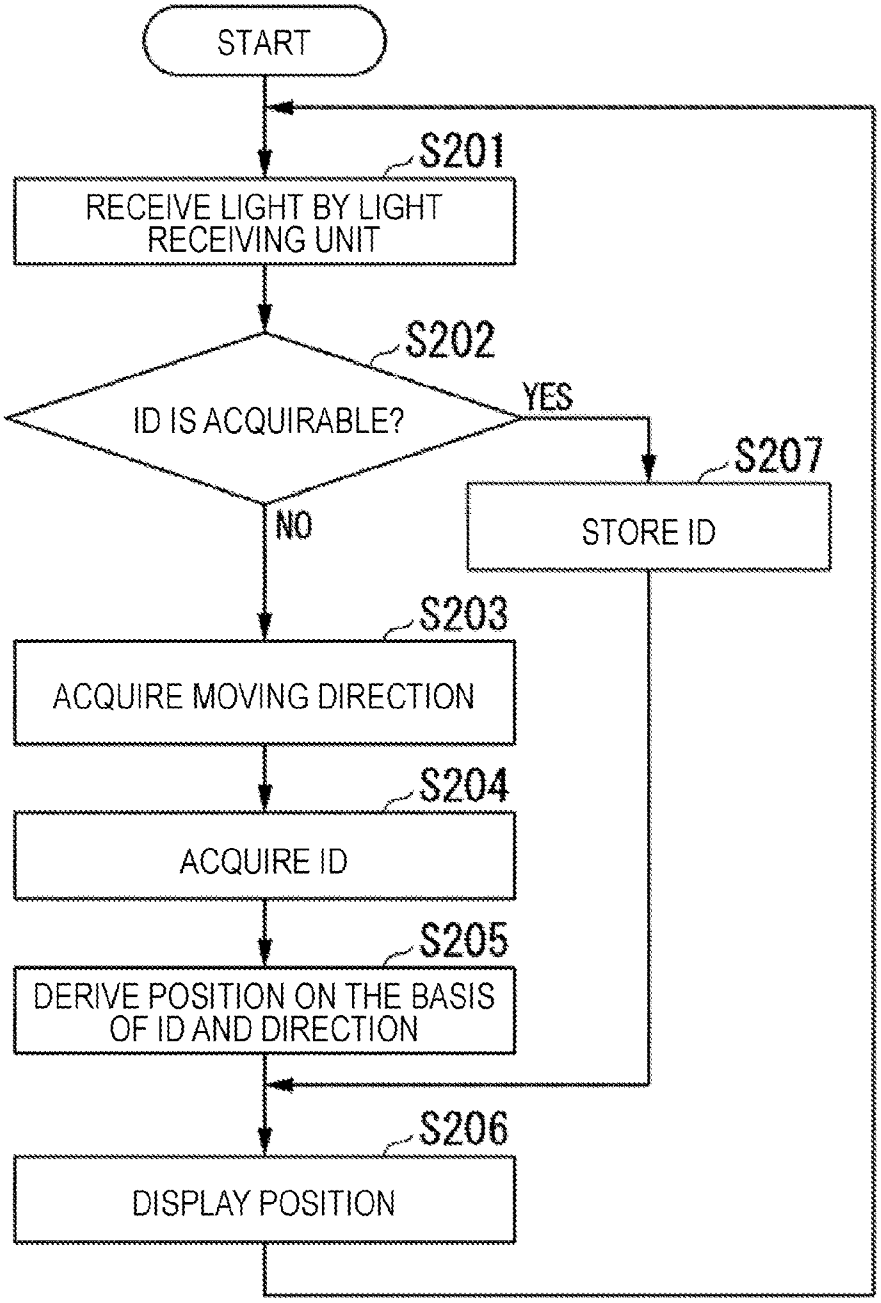
FIG. 10 is a flowchart showing a flow of processing of the mobile terminal 40.

FIG. 10 is a flowchart showing a flow of processing of the mobile terminal 40. This flowchart is executed by an application installed in the mobile terminal 40. A user of the mobile terminal 40 starts the application when entering an area where the position notification system 1 is built. Further, in the mobile terminal 40, as a thread different from a thread for executing the following flowchart, the detection unit 201 detects a moving direction each time a predetermined time arrives and sequentially stores a time at which the detection has been performed and the moving direction at that time.

In FIG. 10, when the light receiving unit 221 receives light (step S201), the determination unit 202 determines whether or not an ID is acquirable from the received light (step S202). When an ID is acquirable (step S202: YES), the determination unit 202 stores the ID (step S207), displays a position corresponding to the ID (step S206), and returns to step S201. In step S207, the ID of an irradiation target region where the mobile terminal is currently located is sequentially updated.

When the ID is not acquirable (step S202: NO), the moving direction acquisition unit 203 acquires the moving direction stored by the detection unit 201 (step S203). Here, the moving direction before it is determined that the ID is not acquirable is acquired. The position derivation unit 204 acquires the ID stored in step S207. Therefore, it is possible to acquire the ID of the irradiation target region where the mobile terminal 40 has been located before it is determined that the ID is not acquirable. The position derivation unit 204 derives the current position of the mobile terminal 40 on the basis of the moving direction and the ID by using the direction database (step S205), displays the derived position on the display operation unit 223 (step S206), and returns to step S201.

Figure 11:
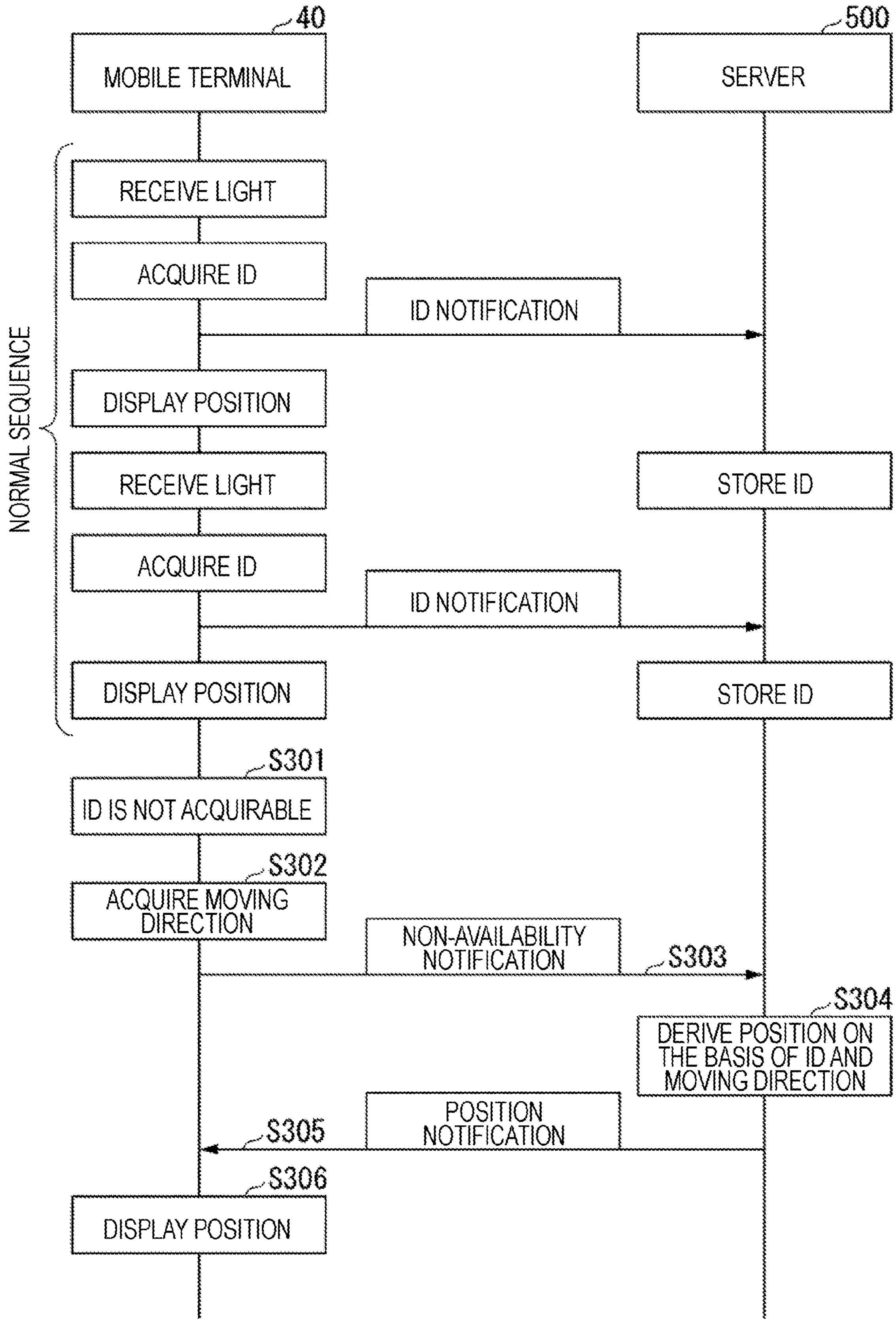
FIG. 11 is a sequence diagram of processing in a position notification system.

In this way, it is possible to derive the current position even in a case where a non-ID area is provided. Therefore, it is possible to reduce the number of lighting devices 20. This makes it possible to economically build a system that makes notification of a position. Note that part of the processing may be performed by a server provided in a cloud. FIG. 11 is a sequence diagram of processing in a position notification system in which a server 500 is added to the position notification system 1.

In a normal sequence, when receiving light and acquiring an ID, the mobile terminal 40 transmits an ID notification to the server 500. The server 500 acquires the ID from the ID notification and stores the ID. The mobile terminal 40 displays a position corresponding to the acquired ID. In the normal sequence, those processing steps are repeatedly performed.

When it is determined that the ID is not acquirable (step S301), the mobile terminal 40 acquires a moving direction before it is determined that the ID is not acquirable (step S302). The mobile terminal 40 transmits a non-availability notification to the server 500 (step S303). The non-availability notification includes the moving direction acquired in step S302.

The server 500 derives the current position of the mobile terminal 40 by using the direction database on the basis of the stored ID and the moving direction received from the non-availability notification (step S304). The server 500 transmits a position notification to the mobile terminal 40 (step S305). The position notification includes the derived position. The mobile terminal 40 displays the position received from the position notification on the display operation unit 223 (step S306).

In this way, it is possible to reduce a processing load of the mobile terminal 40, as compared with a case where the processing in the flowchart of FIG. 10 is executed.

In the above embodiment, the direction database has only four directions, i.e., north, south, east, and west, but the present invention is not limited thereto. For example, assuming that a maximum error of direction detection accuracy is 30°, it is possible to specify a currently belonging area by defining 30°×2n to 30°×(2n+1) as ID areas and 30°×(2n+1) to 30°×(2n+2) as non-ID areas around the own area (n is an integer of 0 or more) even in a case where an area is divided into 360/30=12 directions. By increasing the number of directions to be estimated as described above, it is possible to apply the present invention even in a case where the shape of the area is other than the circle or square used in the above examples.

In the present embodiment, the installation position is decided such that non-ID areas are not adjacent to each other, but the present invention is not limited thereto. For example, the non-ID areas may be slightly adjacent to each other depending on required accuracy. For example, when an ID of a first position is stored, even if the ID cannot be acquired thereafter, an approximate position can be acquired on the basis of the direction detected by the detection unit 201, although accuracy is not high. Therefore, the number of non-ID areas allowed to be adjacent to each other may be flexibly changed according to the required accuracy. Accordingly, it is possible to further reduce the number of lighting devices 20. This makes it possible to economically build a system that makes notification of a position.

Light emitted by the lighting device 20 is not limited to visible light and may be near-infrared light or the like as long as the light can be received by an illuminance sensor or camera. In the above embodiment, information is transmitted by using a blinking pattern, but a color change or intensity of light may be used, instead of the blinking pattern.

While the embodiments of the present invention have been described in detail with reference to the drawings, specific configurations are not limited to these embodiments, and include designs and the like without departing from the spirit of the present invention.

INDUSTRIAL APPLICABILITY

The present invention is applicable to a position notification system that makes notification of an indoor position.

REFERENCE SIGNS LIST

10 Ceiling
20, 20-1, 20-2, 20-3, 20-4 Lighting device
30 Floor surface
40 Mobile terminal
50-1, 50-2 Installation position
100 Decision device
120 Control unit
121 Position information acquisition unit
122 Adjacency information acquisition unit
123 Decision unit
141 Storage unit
200 Control unit
201 Detection unit
202 Determination unit
203 Moving direction acquisition unit
204 Position derivation unit
221 Light receiving unit
222 Communication unit
223 Display operation unit
224 Acceleration sensor
241 Area storage unit
242 Direction storage unit
500 Server

The invention claimed is:

1. A decision method for controlling installation of a lighting device configured to transmit identification information by changing an output mode of emitted light in an indoor positioning system, the method comprising:

dividing a floor region of an indoor space into a plurality of spatial regions;

defining adjacency relationships between the spatial regions based on shared boundaries between the spatial regions;

for each of a plurality of candidate installation positions of the lighting device:

specifying an irradiation target region on the floor region, wherein the irradiation target region is irradiated with the emitted light having the output mode changed to transmit the identification information when the lighting device is installed at the candidate installation position; and identifying, among the spatial regions, non-irradiation target regions not irradiated with the emitted light when the lighting device is installed at the candidate installation position;

selecting a candidate installation position of the plurality of candidate installation positions, such that non-irradiation target regions corresponding to the selected candidate installation position are not adjacent to each other according to the defined adjacency relationships.

2. The decision method of claim 1, wherein changing the output mode of the emitted light comprises changing at least one of a blinking pattern, color, or an intensity of the emitted light.

3. The decision method of claim 1, wherein identifying the non-irradiation target regions comprises determining whether the identification information transmitted by the lighting device is acquirable within each spatial region of the plurality of spatial regions.

4. The decision method of claim 1, wherein selecting the candidate installation position comprises selecting the candidate installation position having the fewest number of spatial regions in which the identification information is not acquirable.

5. A decision device for controlling installation of a lighting device configured to transmit identification information by changing an output mode of emitted light in an indoor positioning system, the decision device comprising:

at least one processor and a memory device storing instructions that, when executed by the at least one processor, cause the at least one processor to perform operations comprising:

dividing a floor region of an indoor space into a plurality of spatial regions;

defining adjacency relationships between the spatial regions based on shared boundaries between the spatial regions;

for each of a plurality of candidate installation positions of the lighting device:

specifying an irradiation target region on the floor region, wherein the irradiation target region is irradiated with the emitted light having the output mode changed to transmit the identification information when the lighting device is installed at the candidate installation position; and identifying, among the spatial regions, non-irradiation target regions not irradiated with the emitted light when the lighting device is installed at the candidate installation position;

selecting a candidate installation position of the plurality of candidate installation positions, such that non-irradiation target regions corresponding to the selected candidate installation position are not adjacent to each other according to the defined adjacency relationships.

6. The decision device of claim 5, wherein changing the output mode of the emitted light comprises changing at least one of a blinking pattern, color, or an intensity of the emitted light.

7. The decision device of claim 5, wherein identifying the non-irradiation target regions comprises determining whether the identification information transmitted by the lighting device is acquirable within each spatial region of the plurality of spatial regions.

8. The decision device of claim 5, wherein selecting the candidate installation position comprises selecting the candidate installation position having the fewest number of spatial regions in which the identification information is not acquirable.

* * * * *